Oct. 23, 1956 M. L. PERSINGER ET AL 2,768,042
TABLE ATTACHMENT FOR BARBECUE EQUIPMENT
Filed July 9, 1956
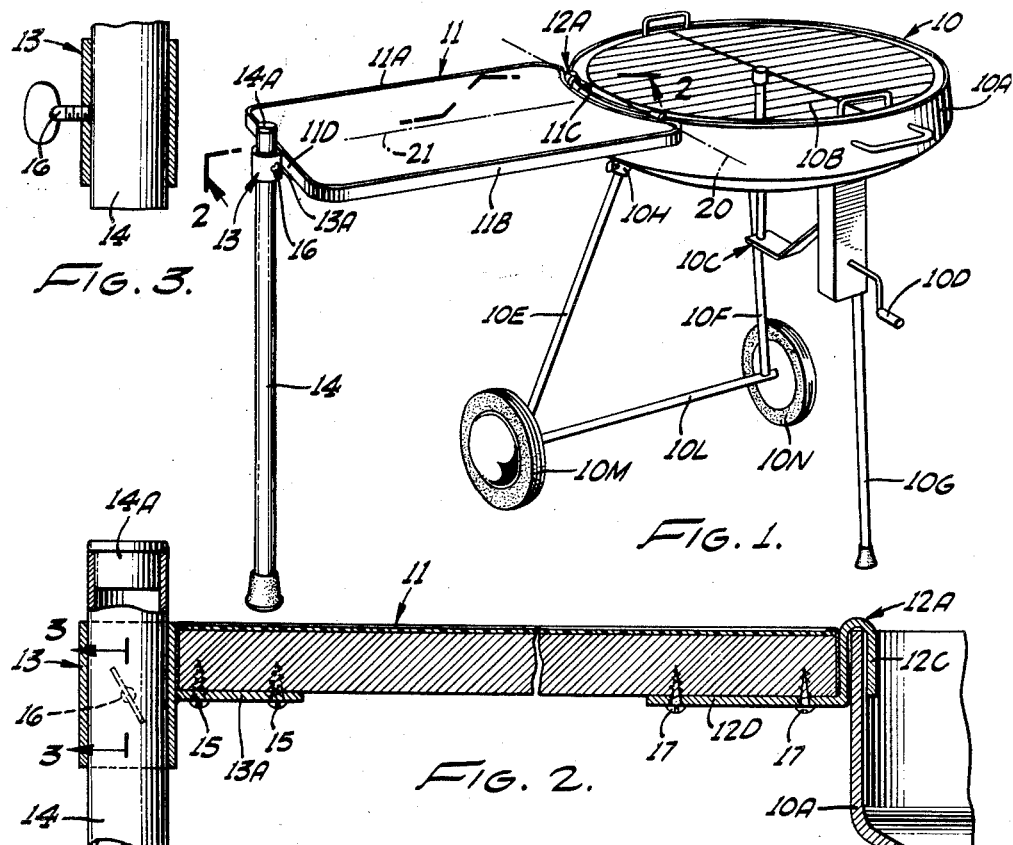
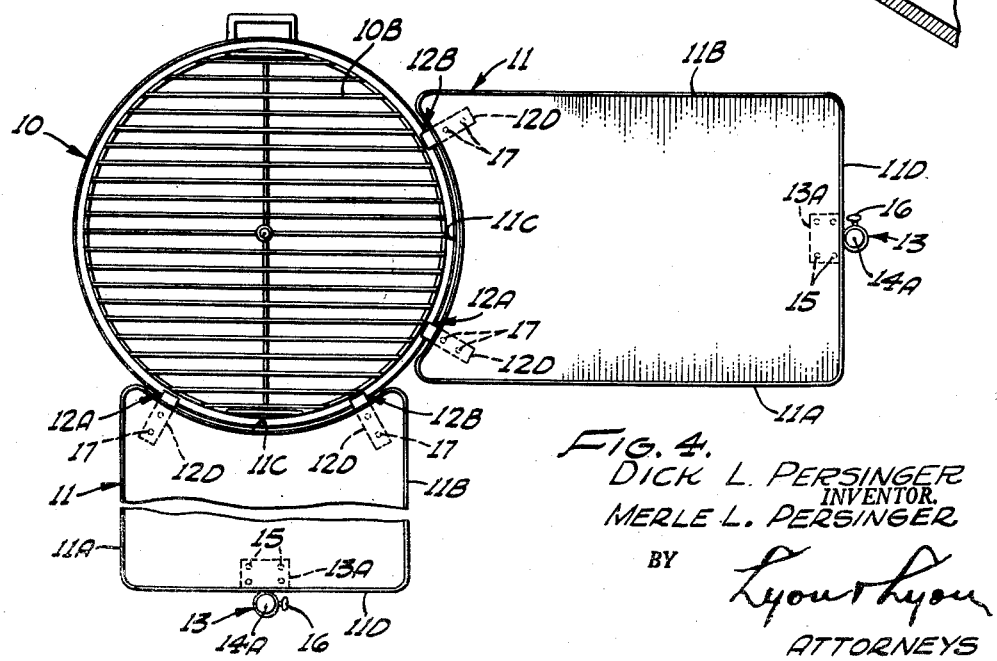
DICK L. PERSINGER
MERLE L. PERSINGER
INVENTOR.
BY Lyon & Lyon
ATTORNEYS

United States Patent Office 2,768,042
Patented Oct. 23, 1956

2,768,042

TABLE ATTACHMENT FOR BARBECUE EQUIPMENT

Merle L. Persinger, Burbank, and Dick L. Persinger, Los Angeles, Calif., assignors to Big Boy Manufacturing Company, a partnership Application July 9, 1956, Serial No. 596,383

1 Claim. (Cl. 311—17)

The present invention relates to barbecue equipment comprising cooking apparatus with a cooperating table and, a more limited sense, to constructional features of a table which may be used with existing cooking apparatus having a circular fire bowl.

An object of the present invention is to provide improved barbecue equipment.

A specific object of the present invention is to provide an improved table for use with cooking apparatus having a fire bowl.

A specific object of the present invention is to provide improved barbecue equipment including a table which may be easily assembled and disassembled for convenience in shipping and storage.

Another specific object of the present invention is to provide improved barbecue equipment incorporating a table in an assembly which is readily portable notwithstanding the fact that the table has a relatively large supporting surface.

Another specific object of the present invention is to provide improved barbecue equipment incorporating a table associated in a novel manner with a circular fire bowl such that the assembly may be easily and conveniently adjusted for use on uneven ground or uneven patio floors.

Another specific object of the present invention is to provide improved barbecue equipment incorporating a table that automatically adjusts itself for unevenness of the ground or patio floor.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings, in which:

Figure 1 is a perspective view of equipment embodying features of the present invention.

Figure 2 is a sectional view taken generally on the line 2—2 of Figure 1.

Figure 3 is a sectional view taken substantially on the line 3—3 of Figure 2.

Figure 4 is a plan view of the barbecue equipment shown in Figure 1 with, however, an additional table added to further demonstrate the utility of the invention.

The barbecue equipment as illustrated includes generally cooking apparatus 10 associated in a novel manner with the novel table 11.

The cooking apparatus 10 is illustrated in the form of a conventional brazier having a circular fire bowl 10A, a grill 10B and conventional manually operated grill raising and lowering mechanism 10C, operated by the handle 10D. The fire bowl 10A is supported by three legs 10E, 10F and 10G which are releasably secured by set screws in corresponding sockets 14H. An axle 10L is secured to the lower ends of the legs 10E and 10F and have mounted thereon a pair of wheels 10M and 10N.

While the cooking apparatus 10 is illustrated in the form of a brazier, the invention is applicable also to other forms of cooking apparatus in which there is a circular fire bowl 10A or other circular member on which the novel table 11 may be hooked for supporting one end of the table.

The table 11, as illustrated, is generally rectangular with four edge portions 11A, 11B, 11C and 11D. The edge portions 11A extend generally parallel with each other; the third edge portion 11C is concave with a curvature that lies substantially on a radius of a circle; and the fourth edge portion 11D is generally straight; and such table preferably has rounded corners, as illustrated.

The edge portion 11C has a pair of hook elements 12A and 12B mounted thereon with such hook portions extending outwardly and downwardly from the edge portion 11C.

A cylindrical socket 13 is mounted centrally on the fourth edge portion 11D with the axis of the cylindrical socket extending generally perpendicular to the plane of the table 11.

The socket 13 has welded thereto a small plate 13A which is secured to the underside of the table 11 by wood screws 15.

A cylindrical tubular leg 14 is slideably mounted in the cylindrical socket 13 and is maintained therein by the set screw 16 which is screwed in the socket portion 16 and engages the leg 14 to maintain the same in adjusted position. The upper end of the adjustable leg 14 is closed by a plug 14A of plastic material.

It is noted that each of the hook elements 12A, 12B is constructed as illustrated in Figure 2 wherein the hook element 12A is illustrated as comprising a generally U-shaped portion 12C with an integrally formed plate 12D which is also secured to the underside of the table 11 by wood screws 17.

By thus mounting the hooks 12A, 12B and the cylindrical socket 13 on the underside of the table 11, a flat table is provided so that the upper surface of the table 11 may lie in a plane which is coextensive with the upper edge of the fire bowl 10A for convenience in handling food and the usual accessories.

Indeed, one of the important features of the present invention is that the table may be adjusted or is automatically adjusted to accommodate itself for use on uneven ground or uneven patio floors, while at the same time providing a solid support. For these general purposes, the hook elements 12A and 12B provide a "loose" connection with the upper edge of the fire bowl 10A, so as to allow movement between the table and the fire bowl whereby the edge portion 11C may automatically adjust itself with respect to the upper edge of the fire bowl, with or without accompanied adjustment of the leg 14. In other words, the hook elements 12A and 12B allow not only some but a limited pivotal movement of the table 11 with respect to the cooking apparatus 10. The "loose" connection thus provided also allows convenient and quick attachment and detachment of the table 11 with respect to the cooking apparatus. It is noted also that these hook elements 12A and 12B not only allow pivotal movement of the table about an axis defined generally by the line 20 but also allows some tilting of the table about an axis represented generally by the line 21 which extends generally perpendicular to the line 20.

It is readily seen that using this construction the table 11 is conveniently adjustable so that it extends in a horizontal plane notwithstanding the fact that there may be unevenness in the ground or the patio floor. It is further seen that notwithstanding the fact that a large work surface is provided for cutting and other purposes, the portability of the unit is readily portable without disassembling the table from the cooking apparatus 10. Thus, to move the assembled equipment, a person need only lift the outer end of the table from engagement with the ground, using one hand, and wheel the cooking apparatus, using his other hand. As illustrated in Figure 4, two tables may be mounted on the same cooking apparatus 10 in like manner to provide a pair of work surfaces arranged generally in an L pattern.

It is observed that the table 11 in and of itself has no utility for its intended purposes as a table but depends for its use on a cooperating supporting structure, such supporting structure being the fire bowl of the cooking apparatus. This is obvious from the fact that the table, as such, has only one leg. At least three points of support are required, and these three points correspond generally to the location of the hook elements 12A, 12B and the socket 13 which define generally the corners of a triangle.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

A table attachment for barbecue equipment, the combination comprising, a generally rectangular barbecue table element having four edge portions with two of such edge portions extending generally parallel, a pair of hook elements mounted in spaced relationship on a third edge portion and extending outwardly and downwardly therefrom, a cylindrical socket mounted centrally on the fourth edge portion and extending outwardly therefrom with the axis of said cylindrical portion extending generally perpendicular to the plane of the table, a cylindrical ground engaging leg slidably mounted in said socket, releasable clamping means on said socket and engaging said leg to maintain the same in adjusted relationship in said socket, said hook elements providing a loose and releasable connection with an edge of said equipment to allow said table element to be pivoted on said equipment edge or to be quickly detached therefrom, said socket and hook elements defining a triangular supporting structure for said table.

References Cited in the file of this patent

UNITED STATES PATENTS

| | | |
|---|---|---|
| 98,751 | Ehrhardt | Jan. 11, 1870 |
| 483,460 | Lindsay | Sept. 27, 1892 |
| 890,693 | McCoy | June 16, 1908 |
| 1,290,072 | Bullock | Jan. 7, 1919 |
| 2,152,168 | Anderson et al. | Mar. 28, 1939 |
| 2,154,165 | Huntington | Apr. 11, 1939 |
| 2,541,528 | McAvoy | Feb. 13, 1951 |
| 2,621,007 | Barbin | Dec. 9, 1952 |
| 2,633,318 | Caples | Mar. 31, 1953 |
| 2,707,141 | Witter | Apr. 26, 1955 |
| 2,721,777 | Willis | Oct. 25, 1955 |